US00RE38195E

(19) United States
(12) Reissued Patent
Sakai et al.

(10) Patent Number: US RE38,195 E
(45) Date of Reissued Patent: Jul. 22, 2003

(54) MULTI-BEAM OPTICAL SCANNER

(75) Inventors: Kohji Sakai, Tokyo (JP); Magane Aoki, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 09/421,332

(22) Filed: Oct. 18, 1999

Related U.S. Patent Documents

Reissue of:
(64) Patent No.: 5,831,758
Issued: Nov. 3, 1998
Appl. No.: 08/868,737
Filed: Jun. 4, 1997

(30) Foreign Application Priority Data

Jun. 5, 1996 (JP) ..... 8-142791
Jan. 9, 1997 (JP) ..... 9-002334

(51) Int. Cl.[7] ..... G02B 26/08
(52) U.S. Cl. ..... 359/204; 359/207; 359/208; 359/216; 347/243

(58) Field of Search ..... 359/204–208, 359/216–219; 347/233, 238, 241–244

(56) References Cited

U.S. PATENT DOCUMENTS

| | | | | | |
|---|---|---|---|---|---|
| 5,025,268 | A | * | 6/1991 | Arimoto et al. | 347/259 |
| 5,526,166 | A | * | 6/1996 | Genovese | 359/204 |
| 5,550,668 | A | * | 8/1996 | Appel et al. | 359/204 |
| 5,671,077 | A | * | 9/1997 | Imakawa et al. | 359/204 |
| 5,861,978 | A | * | 1/1999 | Kamikubo | 359/208 |

FOREIGN PATENT DOCUMENTS

| | | | |
|---|---|---|---|
| JP | 6-48846 | * | 6/1994 |
| JP | 7-111509 | * | 11/1995 |
| JP | 10-54950 | | 2/1998 |

* cited by examiner

*Primary Examiner*—James Phan
(74) *Attorney, Agent, or Firm*—Oblon, Spivak, McClelland, Maier & Neustadt, P.C.

(57) ABSTRACT

A multi-beam optical scanner, in which a lateral magnification β in a composite system of an optical system between the light source for a multi-beam and the scanned surface satisfies the condition: $2<\beta\leqq 8.5$, and a plurality of light spots on the scanned surface execute optical scanning of the scanning lines adjacent to each other.

13 Claims, 8 Drawing Sheets

LIGHT EMITTING SECTION : LD1

LIGHT EMITTING SECTION : LD2

LIGHT EMITTING SECTION : LD3

LIGHT EMITTING SECTION : LD4

CURVE OF IMAGE SURFACE
(W = 40°)

CONSTANT-VELOCITY PERFORMANCE
(W = 40°)

MULTI-BEAM OPTICAL SCANNER

Matter enclosed in heavy brackets [ ] appears in the original patent but forms no part of this reissue specification; matter printed in italics indicates the additions made by reissue.

BACKGROUND OF THE INVENTION

The present invention relates to a multi-beam optical scanner and more particularly to a multi-beam optical scanner realizing a light spot in an appropriate form on a scanned surface and effectively reducing degradation in image quality of a recorded image due to pitch deviation.

BACKGROUND OF THE INVENTION

An optical scanner has been known in relation to an image forming apparatus, such as a digital copying machine, an optical printer, and an optical printing machine or the like. In the optical scanner as described above, there has been proposed a multi-beam optical scanning system for optically and concurrently scanning an image with a plurality of scanning lines for the purpose of speeding up an operation for writing images by way of optical scanning.

In the multi-beam optical scanning system, there is sometimes a case where scanning lines for optically and concurrently scanning are not adjacent to each other. There has been proposed, for instance, in Japanese Patent Publication No. HEI 6-[418846] *48846*, a so-called "interlace scanning" type of multi-beam optical scanner in which interlace scanning is executed by means of three scanning lines without one line therebetween.

In the interlace scanning as described above, selection of a signal for modulating each beam is irregular, so that optical scanning is easily complicated, and in addition, scanning lines for optically concurrently scanning are also largely spaced therebetween, so that "a rate of pitch deviation" of optical scanning due to a bend in the scanning lines becomes large, which makes it easy for image quality of a recorded image to degrade.

In the multi-beam optical scanner, there are strict restriction over a magnification in an image-formation system provided in a space between the light source and the surface for scanning due to a relation between pitches of scanning lines, and because of the restrictions over a magnification as described above, a position of an optical system to be provided in a side of the light source from the optical deflector must be closer to the optical deflector, and for this reason, a layout of optical arrangement becomes difficult.

Further, if a "hybrid" combination of two or more LD light emitting sections or LED light emitting sections is employed as a light source having a plurality of light emitting sections used in the multi-beam optical scanner, there occurs a problem of "wavelength deviation" that wavelengths of combined light emitting sections are not identical to each other, and when this wavelength deviation is present therein, constant velocity characteristics of optical scanning or the like may vary for each light emitting section.

What is known as a multi-beam optical scanning system is disclosed in Japanese Patent Publication No. HEI 7-111509, but in this optical scanning system a focal length of a lengthy lens for correcting surface offset is as short as 15 mm, and for this reason the lengthy lens is provided at a position close to the scanned surface, which makes larger a length in a direction corresponding to the main scanning as well as cost of the lengthy lens higher, and also toner splashed from a developing device generally provided adjacent to the scanned surface easily makes the lengthy lens contaminated.

SUMMARY OF THE INVENTION

It is an object of the present invention to effectively reduce degradation in image quality in a recorded image due to pitch deviation, in addition, to enable effective reduction of cost of a lengthy lens included in an optical system for converging deflected light fluxes on the scanned surface, and also to effectively suppress contamination of the lengthy lens due to splashed toner.

It is another object of the present invention to realize a multi-beam optical scanner in which a layout of optical arrangement is easy arid which is hardly affected by wavelength deviation in the light source.

The multi-beam optical scanner according to the present invention comprises a light source for a multi-beam, a coupling lens, a first image-formation system, an optical deflector, and a second image-formation system.

Herein, the light source for a multi-beam is a monolithic light source in which a plurality of LD light emitting sections or LED light emitting sections are arranged in a direction corresponding to an auxiliary scanning. The light source for a multi-beam can also comprise a plurality of LD light emitting sections or LED light emitting sections by means of hybrid combination thereof. A plurality of light emitting sections obtained by the hybrid combination thereof are different bodies from each other.

Herein the direction corresponding to auxiliary scanning is defined as a direction corresponding to a direction of auxiliary scanning in parallel on a virtual light path linearly extending along an optical axis in a light path from the light source to the scanned surface.

The coupling lens is a lens for coupling a plurality of light fluxes from the light source for a multi-beam to an image-forming optical system (optical system for forming on the scanned surface images in a plurality of light emitting sections in the light source for a multi-beam). A mode of coupling can be a mode for converting light fluxes from light emitting sections coupled to each other to parallel light fluxes or a mode in which each of light fluxes becomes one having weak converging performance or weak diverging performance.

The first image-formation system is an optical system for focusing a plurality of light fluxes coupled by the coupling lens and forming an image as a plurality of line images each long in a direction corresponding to the main scanning, and can use a convex cylinder lens or a concave cylinder mirror without having power in the direction corresponding to the main scanning. Wherein a direction corresponding to main scanning indicates a direction corresponding to a direction of main scanning in parallel on the virtual light path.

The optical deflector is a means having a deflecting reflection surface provided adjacent to a position for forming an image out of a plurality of line images for deflecting a plurality of light fluxes, and a known polygon mirror, a rotating double-face mirror, or a rotating single-face mirror or the like may be used for this purpose.

The second image-formation system is an optical system for separating a plurality of light fluxes deflected by the optical deflector from each other in an auxiliary scanning direction on a scanned surface and converging the plurality of light fluxes as a plurality of light spots optically scanning the surface to be scanned in accordance with deflection of the light fluxes, and includes a lengthy lens provided on the side of a scanned surface. Namely, the second image-formation system comprises a fθ lens and a lengthy lens provided on the side of the scanned surface thereof.

The lengthy lens is a lens having function of correcting surface offset [and curve of an image surface] each in the optical deflector *and curve of an image surface* such as a length cylinder lens or a lengthy toroidal lens or the like. The lengthy toroidal lens may also include a barrel-shaped toroidal surface as a concave lens surface with a curvature radius thereof in a direction corresponding to auxiliary scanning being smaller in accordance with its separation from the optical axis in a direction corresponding to the main scanning.

The second image-formation system may comprise a constant-velocity optical-scanning image-forming mirror and a lengthy toroidal lens as a lengthy lens provided on the side of the scanned surface other than the configuration by combining two types of lens as described above.

A lateral magnification β in a direction corresponding to the auxiliary scanning in a composite system of the optical system between the light source for a multi-beam and the scanned surface satisfies the following expression:

$$2<\beta\leqq 8.5 \quad \ldots (1)$$

and a plurality of light spots optically scan scanning lines adjacent to each other.

The lateral magnification β is made larger than 2, and by employing a "scaling-up type" of composite system, a lengthy lens included in the second image-formation system can effectively be separated from the scanned surface.

Also, when the lateral magnification β in the composite system is larger than 8.5 times, in order to realize a pitch of scanning lines of 84.7 μm corresponding to the minimum dot density of 300 dpi required to the optical scanner, a space between light emitting sections in the light source for a multi-beam becomes not more than 10 μm, and "thermal crosstalk (a phenomenon that light emission in other light emitting section is affected by heating in one light emitting section)" between LD light emitting sections or LED light emitting sections rapidly increases, so that it is difficult to control discretely blinking of each of the light emitting sections.

The light source for a multi-beam has also two LD light emitting sections, and the two light emitting sections can be provided at symmetric positions with respect to an optical axis of a collimate lens. In this case, as a light source for a multi-beam, one having a space between the two LD light emitting sections of 14 μm is used, and a lateral magnification β in a direction corresponding to the auxiliary scanning in the composite system of an optical system between the light source for a multi-beam and the scanned surface can be made 4.536 times.

Further, by satisfying the conditions, the lengthy lens included in the second image-formation system can effectively be separated from the scanned surface, and in order to realize a pitch between scanning lines of 84.7 μm corresponding to the minimum dot density of 300 dpi required to the optical scanner, a space between light emitting sections in the light source for a multi-beam can be maintained by not less than 10 μm with which thermal crosstalk does not occur.

In the present invention, a diameter of a light spot or a pitch between scanning lines on the scanned surface are decided mainly by means of an image forming magnification in "an optical system in the side of the light source side" and an image-forming magnification in the second image-formation system according to a coupling lens and the first image formation system.

The image-forming magnification of the optical system in the side of the light source is decided by means of a magnification of the coupling lens and an image-forming magnification of the first image-formation system, however, a light flux coupled by the coupling lens is weak in converging performance or in diverging performance even in both cases where the light flux becomes a light flux to be converged and where it becomes a light flux to be diverged, so that a value of an image-forming magnification of the optical system in the side of the light source becomes substantially close to a ratio between a focal length of a coupling lens and that of the first image-formation system.

When the value becomes lower than a lower limit of the condition (1), a focal length in the first image-formation system for realizing a magnification required for an optical system in the side of the light source becomes smaller, and the first image-formation system approaches the optical deflector too close, which causes an obstacle for a layout of the optical arrangement. Especially, when the first image-formation system comprises "a piece of lens", and the second image-formation system includes a constant-velocity optical-scanning image-forming mirror, sometimes there may occur a case where a light flux reflected on the constant-velocity optical-scanning image-forming mirror is truncated by the first image-formation system.

Other objects and features of this invention will become understood from the following description with reference to the accompanying drawings.

DESCRIPTION OF THE PREFERRED EMBODIMENTS

Figure 1A:
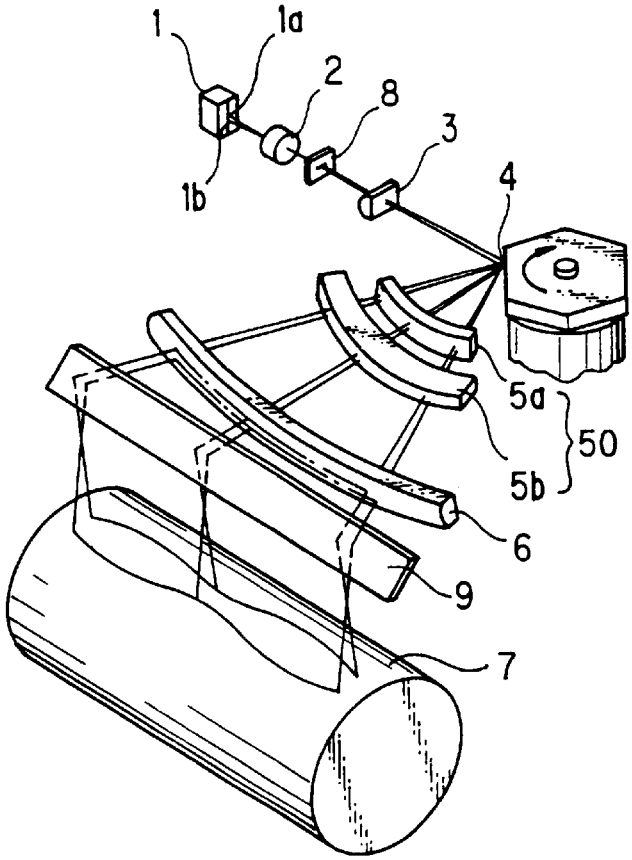
FIGS. 1A and 1B show views each for explaining Embodiment 1 of the invention [according to claim 1 of the present invention]
Figure 1B:
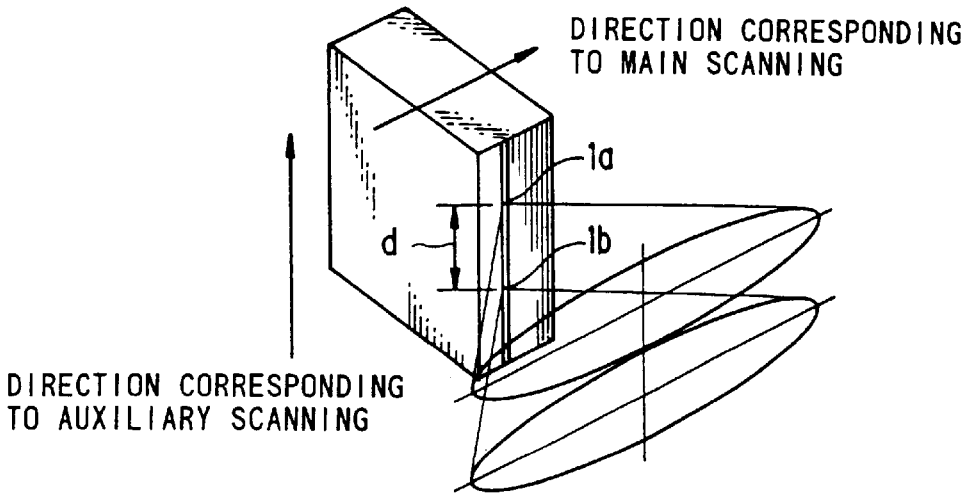

In FIG. 1A, a light source 1 for a multi-beam is, as shown in FIG. 1B, a monolithic semiconductor laser having two LD light emitting sections 1a and 1b provided therein so that the two light emitting sections 1a, 1b are arranged with a space d in a direction corresponding to the auxiliary scanning.

In FIG. 1A, both of two light fluxes radiated from the two LD light emitting sections 1a and 1b in the light source 1 for a multi-beam are converted to parallel ones by a collimate lens 2. The LD light emitting sections 1a and 1b in the light source 1 for a multi-beam are provided at positions each at an equal distance (d/2) from the optical axis of the collimate lens 2 respectively.

The two light fluxes radiated from the collimate lens 2 are cut off in each of peripheral sections of the light fluxes by an aperture 8 for beam formation to enter a cylinder lens 3 as a first image-formation system.

The cylinder lens 3 has positive power only in a direction corresponding to the auxiliary scanning, focuses the two light fluxes only in the direction corresponding to the auxiliary scanning respectively, and forms an image as two line images each long in the direction corresponding to the main scanning.

A polygon mirror as "an optical deflector" has a deflecting reflection surface 4 adjacent to a position for forming images of the two line images and deflects the two light fluxes. The deflected two light fluxes are separated from each other in the auxiliary direction on the scanned surface (the peripheral surface of a drum-shaped photosensitive body) 7 according to an fθ lens 50 (comprising two pieces of co-axial lenses 5a and 5b) constituting "the second image-formation system" and action of image-formation by a lengthy lens 6 for correcting surface offset, and are converged as two light spots optically and concurrently scanning the surface to be scanned in accordance with deflection of the light fluxes. The lengthy lens 6 is "a lengthy toroidal lens".

In the embodiment shown in FIG. 1A, the light fluxes passing through the second image-formation system are bent in their light path by a light path bending mirror 9, are focused on the photosensitive body 7 with the peripheral surface thereof matching with the scanned surface, and optically scan the peripheral surface thereof. Accordingly, the scanned surface is optically and concurrently scanned with two scanning lines.

Figure 2A:
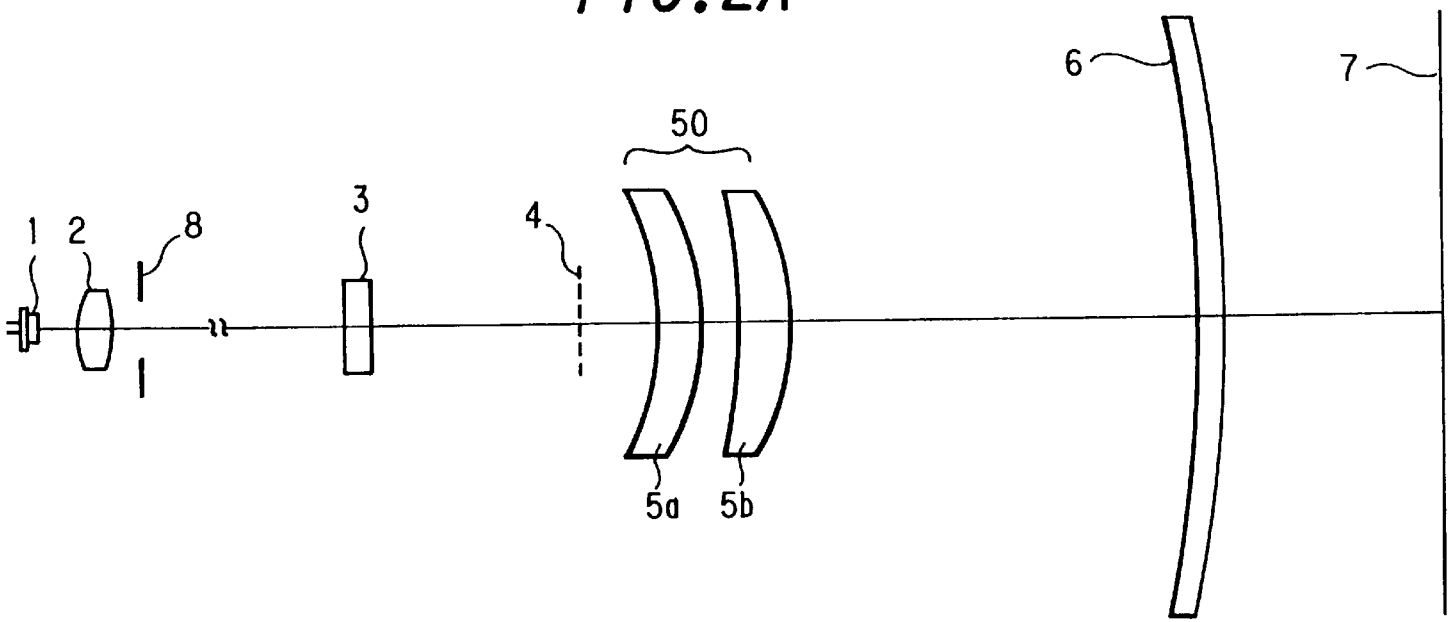
FIGS. 2A and 2B show views each for explaining optical arrangement in Embodiment 1 shown in FIGS. 1A and 1B.
Figure 2B:
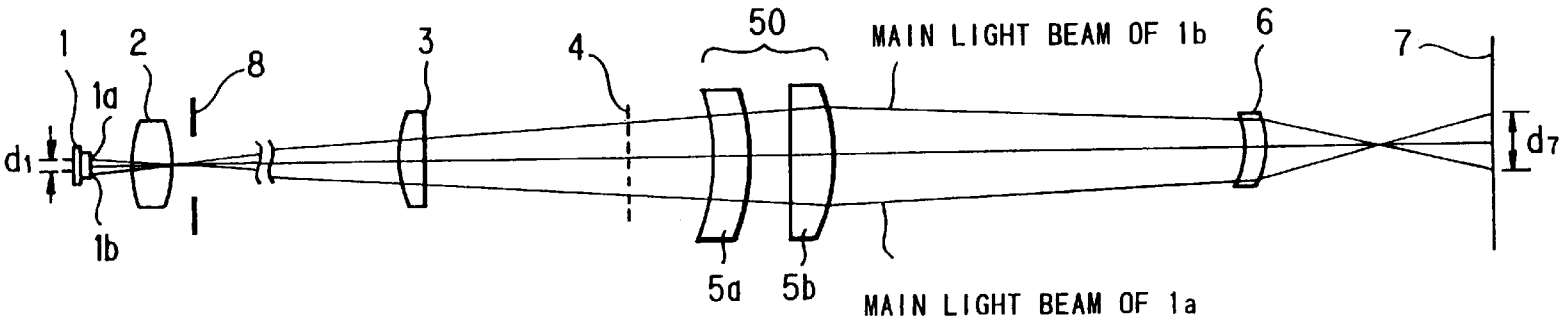

FIGS. 2A and 2B show optical arrangement "on the virtual light path" as described above linearly extending along the optical axis the distance from the light source 1 for a multi-beam and the scanned surface 7, and in FIG. 2A, the vertical direction indicates "a direction corresponding to the main scanning", while in FIG. 2B, the vertical direction indicates "a direction corresponding to the auxiliary scanning".

The fθ lens 50 and the lengthy lens 6 make, in the direction corresponding to the auxiliary scanning, the position of the deflecting reflection surface 4 and that of the scanned surface 7 have a conjugational relation, and for this reason the lengthy lens 6 has a function of correcting "surface offset" of the polygon mirrors an optical deflector. Assuming that a focal length of the collimate lens 2 is $f_2$ a focal length of the lengthy lens 6 is $f_6$, the relation therebetween is $f_2<f_6$.

Figure 5A:
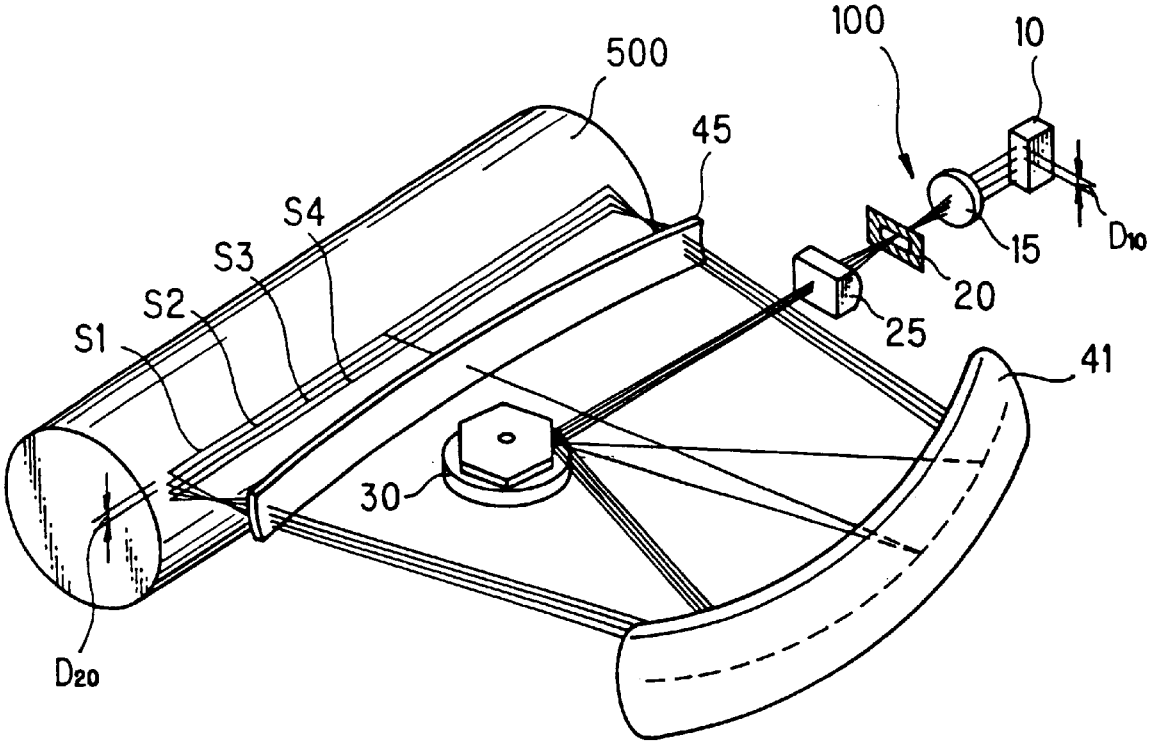
FIGS. 5A and 5B show views each for explaining Embodiment 1 of the present invention.
Figure 5B:
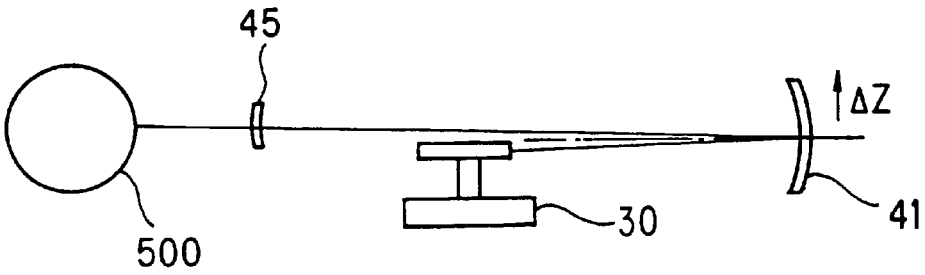

Description is made for Embodiment 1 of the invention [according to claims 3 to 6 of the present invention] with reference to FIGS. 5A and 5B.

In FIG. 5A, a light source 10 for a multi-beam is a light source with a plurality of LD light emitting sections (four sections in the figure) or LED light emitting sections arranged in the direction corresponding to the auxiliary scanning.

A plurality of light fluxes from the light source 10 for a multi-beam are coupled to the "image-forming optical system" by a coupling lens 15, each of the light fluxes becomes parallel fluxes, or a flux weak in converging performance or weak in diverging performance, a diameter of which is restricted by an aperture 20 for beam formation, goes into a piece of cylinder lens 25 as "the first image-formation system having positive power only in the direction corresponding to the auxiliary scanning", whereby images are formed as "a plurality of line images each long in the direction corresponding to the main scanning" on a place adjacent to the deflecting reflection surface of the polygon mirror 30 which is an optical deflector.

The plurality of light fluxes deflected by the polygon mirror 30 go into the constant-velocity optical-scanning image-forming mirror 41 to be reflected therefrom, separate from each other in the auxiliary scanning direction on the peripheral surface of the drum-shaped photosensitive body 500 actually forming the "scanned surface" through a lengthy toroidal lens 45 as a lengthy toroidal lens together with the constant-velocity optical-scanning image-forming mirror 41 constituting the second image-formation system, are converged as a plurality of light spots (four spots in the figure) for optically and concurrently scanning the scanned surface in accordance with deflection of the light fluxes, and a plurality of scanning lines S1, S2, S3, S4 are optically and concurrently scanned. The scanning lines S1, S2, S3, S4 are "adjacent to each other".

A lateral magnification β in the direction corresponding to the auxiliary scanning in the composite system (the coupling lens 15, cylinder lens 25, constant-velocity optical-scanning image-forming mirror 41, lengthy toroidal lens 45) of the optical system between the light source 10 for a multi-beam and the scanned surface is a ratio $D_{20}/D_{10}$ between a space $D_{10}$ of two adjacent light emitting sections in the light source 10 for a multi-beam in the direction corresponding to the auxiliary scanning and a space $D_{20}$ of scanning lines by light spots according to light fluxes from those light emitting sections, and is set in a range of "$2<\beta\leqq 8.5$".

The constant-velocity optical-scanning image-forming mirror 41 reflects light fluxes deflected at constant velocity, has, together with the lengthy toroidal lens 45, functions for forming images on the scanned surface as light spots as well as for making constant the scanning speed of the light spots, and because of this function for constant velocity thereof, this mirror is called as "a constant-velocity optical-scanning image-forming mirror".

FIG. 5B shows a state of the light path from the polygon mirror 30 to the photosensitive body 500 viewed from the direction corresponding to the main scanning. The constant-velocity optical-scanning image-forming mirror is shifted to the upper side in the figure by a shift rate ΔZ as shown in FIG. 5B for separating the incident light path of deflected light fluxes from the polygon mirror 30 from the light path of reflected and deflected light fluxes.

In a case where the second image-formation system comprises an fθ lens and a lengthy toroidal lens, although there is a problem that effect of constant velocity according to the fθ lens is changed in accordance with a wavelength of a light flux and optical scanning with each light spot is executed at a different scanning speed if there is "wavelength deviation" in a light source for a multi-beam, a light flux reflected and deflected by the constant-velocity optical-scanning image-forming mirror is not affected by wavelength deviation, and for this reason, the above problem does not occur even if a light source for a multi-beam comprising "two or more LD light emitting sections or LED light emitting sections in hybrid combination thereof" which might generate wavelength deviation is used.

An element monolithically having two or more LD light emitting sections or LED light emitting sections may be used for a light source 10 for a multi-beam, or "an element having two or more LD light emitting sections or LED light emitting sections in hybrid combination thereof" may also be used as described above.

In the embodiment described above with reference to FIGS. 1A and 1B and FIGS. 2A and 2B, resolution on the scanned surface by means of optical scanning was set to 400 dpi (a pitch between scanning lines: 63.5 μm, a distance in FIGS. 2A and 2B:$d_7$). An element having a space d between the two LD light emitting sections 1a and 1b of 14 μm was used as the light source 1 for a multi-beam.

A lateral magnification βm in the composite system including the collimate lens 2, the first image-formation system 3, and the second image-formation system (the fθlens 50 and the lengthy lens 6) in the direction corresponding to the auxiliary scanning may be set to 63.5 μm/14 μm=4.536 times.

When it is set, "a distance from the optical axis of the collimate lens 2" to each of the LD light emitting sections 1a, 1b in the light source 1 for a multi-beam is 7 μm. The lateral magnification β of 4.536 times satisfies the conditional expression (1).

As a result of designing the collimate lens 2, cylinder lens 3, fθ lens 50, and lengthy lens 6 to realize the above lateral magnification β which is 4.536 times, the following values are obtained such as a focal length of the collimate lens 1: $f_2$=15.915 mm and a focal length of the lengthy lens 6: $f_6$=70 mm, so that the lengthy lens 6 can be provided sufficiently apart from the scanned surface, which makes it possible to effectively reduce dirt thereonto due to splashed toner.

Also, the distance between the LD light emitting sections 1a, 1b in the light source 1 for a multi-beam and the optical axis of the collimate lens 2 is small such as 7 μm, and a deviation rate of a pitch described later becomes smaller, whereby it is possible to sufficiently insure fidelity in reproduction of a recorded image.

The distance between the LD light emitting sections 1a, 1b and the optical axis of the collimate lens 2 is small such as 7 μm, whereby wave surface aberration of two light fluxes radiated from the collimate lens 2 is also small, so that degradation in a form of a light spot due to the wave surface aberration hardly occurs.

Figure 3:
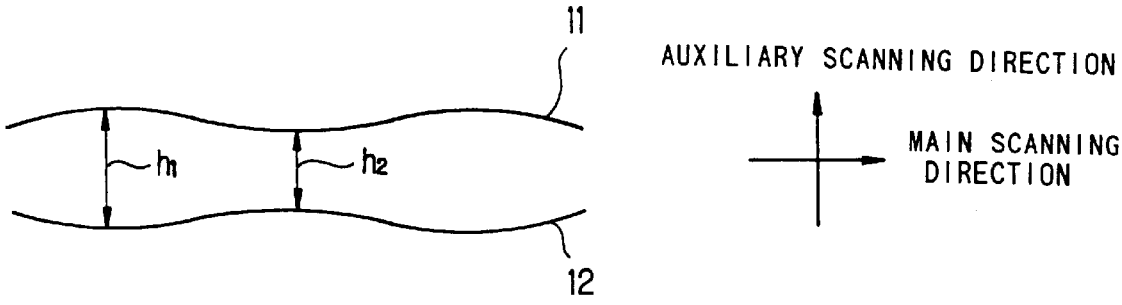
FIG. 3 shows views each for explaining a deviation rate of a pitch.

FIG. 3 shows, in a case of the above embodiment, states of two scanning lines 11, 12 concurrently and optically scanned by two light spots by exaggerating them. Any of the two LD light emitting sections 1a, 1b in the light source 1 for a multi-beam is not present on the optical axis of the collimate lens 2 (which is matched with the optical axis of the cylinder lens 3 and the fθ lens 50/lengthy toroidal lens 6), and the two scanning lines become curves each bent in the direction of auxiliary scanning. The LD light emitting sections are provided at positions "symmetric in the direction corresponding to the auxiliary scanning" with respect to the optical axis thereof, so that curves of the scanning lines also become "forms symmetric with respect to the direction corresponding to the auxiliary scanning".

As shown in FIG. 3, it is assumed herein that "a maximum value" of a space h between two scanning lines 11 and 12 adjacent to each other is set to $h_1$ and "a minimum value" thereof is $h_2$.

A deviation rate δ of a pitch between scanning lines is defined as described later according to a difference between the $h_1$ and $h_2$: $\Delta h=h_1-h_2$ as well as to a normal pitch (a pitch between scanning lines decided directly from dpi) $P_N$, "$\delta=\Delta h/P_N\times 100\%$".

Generally, a deviation rate of a pitch therebetween which can maintain fidelity in reproduction of a recorded image is assumed to be "not more than about 8 to 10%".

In the embodiment, Δh is 6.14 μm. $P_N$ is 63.5 μm, accordingly, a deviation rate of a pitch is as follows: δ=(6.14/63.5)×100=9.7%, so that fidelity in reproduction of a recorded image can sufficiently be maintained.

For the purpose of comparison, "three LD light emitting sections with a space d thereamong by 28 μm" are used as a light source for a multi-beam in the optical arrangement in the above embodiment as it is (the central light emitting section thereof is positioned on the optical axis of the collimate lens and each of the light emitting sections in both sides is apart by 28 μm from the optical axis thereof in the direction corresponding to the auxiliary scanning respectively), and the three scanning lines are scanned at the same time.

The lateral magnification β in the optical system (the composite system including the collimate lens 2, the first image-formation system 3 and the second image-formation system) between the light source 1 for a multi-beam and the scanned surface is 4.536 times, and for this reason the three light spots on the scanned surface are separated from each other by 28 μm×4.536=127 μm in the direction of auxiliary scanning.

Figure 4:
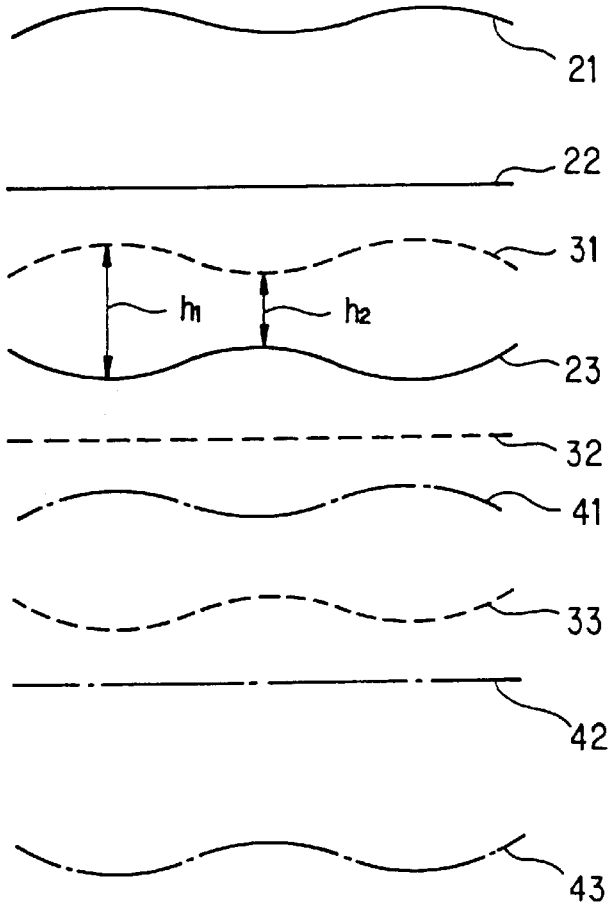
FIG. 4 shows views each for explaining a deviation rate of a pitch in an example of comparison.

In this case, scanning lines to concurrently be scanned are "alternate lines" as shown in FIG. 4. Namely, scanning lines 21, 22, 23 each indicated by a solid line are concurrently scanned in a first optical scanning, scanning lines 31, 32, 33 each indicated by a broken line are concurrently scanned in the next optical scanning, and scanning lines 41, 42, 43 each indicated by a dashed line are concurrently scanned in the following optical scanning. The same operations are carried out thereafter and on.

At that time, a deviation rate of a pitch δis a proportion of a difference $h_1fh_2$ between the maximum space $h_1$ and the minimum space $h_2$ between adjacent scanning lines as shown in FIG. 4 to a normal pitch (127 μm/2=63.5 μm) between scanning lines.

In contrast to Δh=6.14 μm as described above in the embodiment, in this example for comparison, the space therebetween becomes four times as large as that in the embodiment such as Δh=24.56 μm, the deviation rate of a pitch is such large as follows:δ=(24.56/63.5)×100=38.68%, so that fidelity in reproduction of a recorded image can not sufficiently be maintained.

Degradation in a form of a light spot due to wave surface aberration is also significant in two spots in both sides in the direction of auxiliary scanning out of three light spots, which also causes the fidelity in reproduction of a recorded image to be degraded.

Figure 6A:
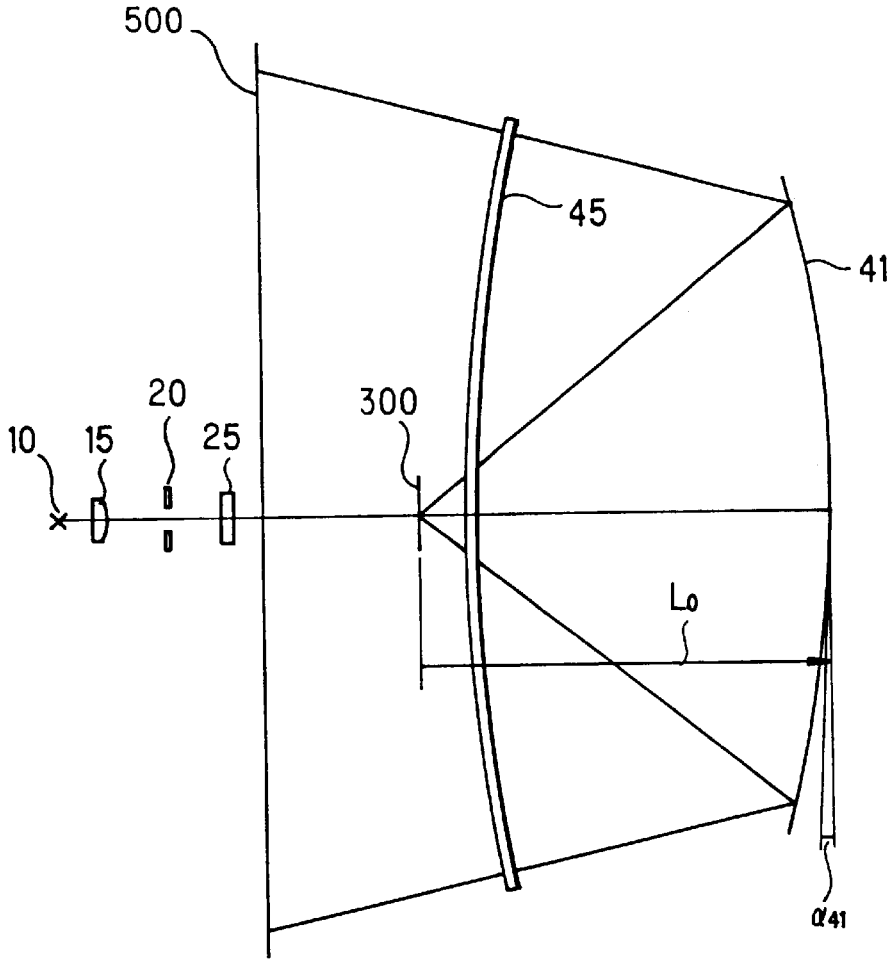
FIGS. 6A and 6B show views each for explaining optical arrangement in the embodiment shown in FIGS. 5A and 5B.
Figure 6B:
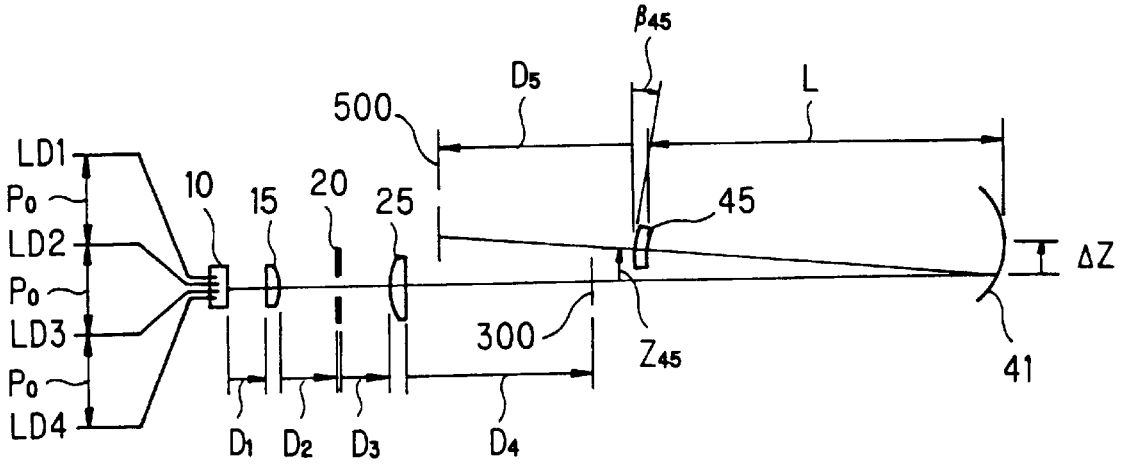

The optical system in the multi-beam optical scanner according to the embodiment described above with reference to FIGS. 5A and 5B are constructed as shown in FIGS. 6A and 6B. FIG. 6A, FIG. 6B show a light path in a portion from the light source 10 for a multi-beam to the constant-velocity optical-scanning image-forming mirror 41 in the entire light path from the light source 10 for a multi-beam to the scanned surface assuming that the partial light path is "linearly extended".

The light source 10 for a multi-beam has, as shown in FIG. 6B, four LD light emitting sections LD1, LD2, LD3, LD4 each with a wavelength of emitted light of 780 nm spaced uniformly with a space P between the light emitting sections of 14 μm in the direction corresponding to auxiliary scanning.

The coupling lens 15 is "a plane-convex regular lens" having a curvature radius of a surface in the side of the light source: $r_{CP1}=\infty$(plane), a curvature radius of a surface (spherical surface) in the side of the cylinder lens 25:$r_{CP2}=-10.2987$ mm, a wall thickness of the lens: $d_{CP}=3$ mm, a wavelength of a material to a light having a wavelength 780 nm: $n_{CP}=1.712205$, and a focal length: f_14.46 mm.

The cylinder lens 25 as one piece of the first image-formation system having positive power only in the direction corresponding to auxiliary scanning has a convex cylinder surface with a curvature radius of a line in the side of the light source: $r_{CY1}=29.5$ mm, a curvature radius in the side of the deflecting reflection surface thereof: $r_{CY2}=\infty$to (plane), a wall thickness of the lens: $d_{CY}=3$ mm, a wavelength of a material to a light having a wavelength 780 nm: $n_{CY}$_1.511176, and a focal length in the direction corresponding to auxiliary scanning: $f_{CY}=57.71$ mm.

Spaces of optical elements: $D_1$, $D_2$, $D_3$, $D_4$ on the light path, as shown in FIG. 6B, from the light source 10 for multi-beam to a deflecting reflection surface 300 of the polygon mirror 30 are as follows: $D_1=12.569$ mm, $D_2=14.46$ mm, $D_3=20$ mm, and $D_4=57.8$ mm.

Each of the light fluxes coupled by the coupling lens 15 is "a light flux weak in a divergence", and a starting point of a virtual divergence is positioned at "−1712.082 mm" obtained by measuring a space from the reflecting surface of the constant-velocity optical-scanning image-forming mirror 41 to the side of the light source. Namely, the coupled light fluxes go into, assuming that other optical system is not provided therein, the constant-velocity optical-scanning image-forming mirror 41 as diverging light fluxes as if they are radiated from the position apart by −1712.082 mm from the reflecting surface of the constant-velocity optical-scanning image-forming mirror 41.

The constant-velocity optical-scanning image-forming mirror 41 is a reflecting mirror having "a reflecting surface with a concave surface of a coaxial non-spherical surface" obtained by rotating a curve indicated by the expression described below around the X-axis using a coordinate in a direction of the optical axis: X, a coordinate in a direction crossing the optical axis at right angles: H, a paraxial curvature: C(=1/R; R indicates a radius of a paraxial curvature), a conical constant: K, and a coefficient of higher order: $A_i$:

$$X(H)=CH^2/[+\sqrt{[1-(1+K)C^2H^2]}]+\Sigma A_i\cdot H^i \quad \ldots (2)$$

Wherein the i-th power indicates the 4-th, 6-th, 8-th, 10-th, 12-th, . . . power.

In the embodiment which is now being described, the form of the reflecting surface of the constant-velocity optical-scanning image-forming mirror 41 is obtained by setting the above R, K, arid A, to values respectively as follows:

$R=-405.046$ mm,$K=-1.46661$, $A_4=3.12269\times10^{-10}$, $A_6$_9.19756×10−15,1

$A_8=-1.14431\times10^{-18}$,$A_{10}=-1.39095\times10^{-23}$

Assuming that a distance from the deflecting reflection surface 300 to the reflecting surface of the constant-velocity optical-scanning image-forming mirror 41 is set to "$L_o$" as 23 shown in FIG. 6A, $L_o$ is equal to 124. 179 mm.

As shown in FIG. 6B, a shift rate of the constant-velocity optical-scanning image-forming mirror 41 is as follows: $\Delta Z=17$ mm. The constant-velocity optical-scanning image-forming mirror 41 is also tilted by an angle in the direction corresponding to main scanning $\alpha_{41}$ of 0.2 degree in a surface in parallel to the surface on which the light fluxes are deflected by the deflecting reflection surface 300.

Figure 7:
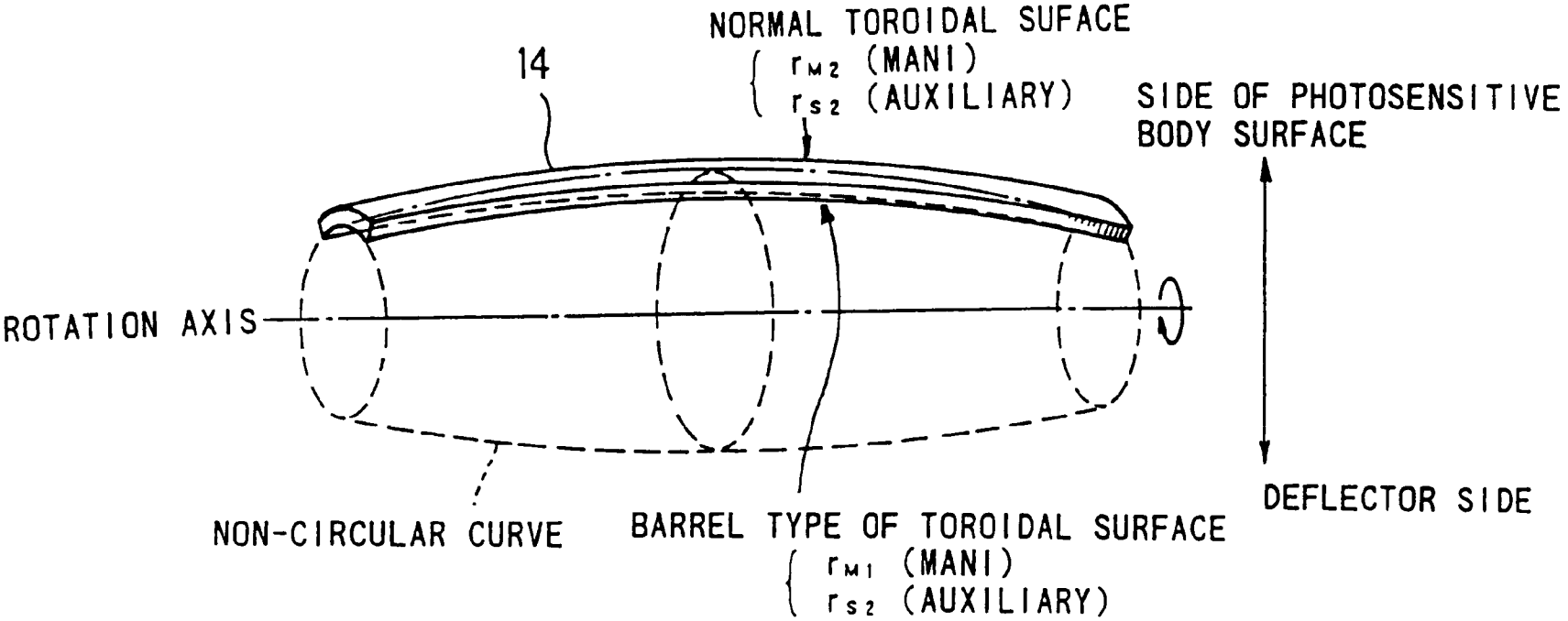
FIG. 7 is a view for explaining a lengthy toroidal lens as a lengthy lens included in the second image-formation system.
Figure 8A:
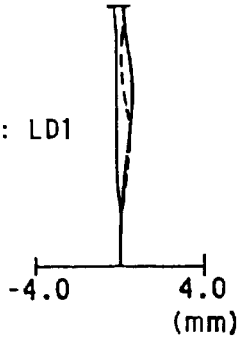
FIGS. 8A to 8H show views each showing curve of an image surface as well as constant velocity characteristics to a light flux from each of light emitting sections in one of examples for carrying it out for Embodiment 1 shown in FIGS. 5A and 5B.
Figure 8B:
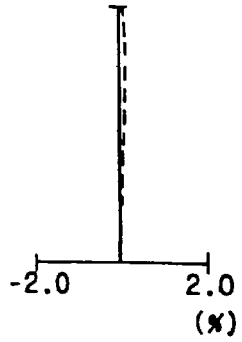
Figure 8C:
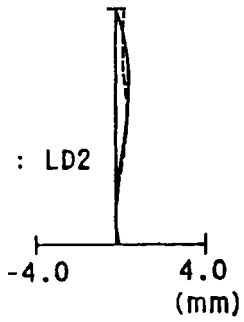
Figure 8D:
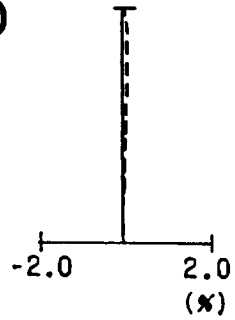
Figure 8E:
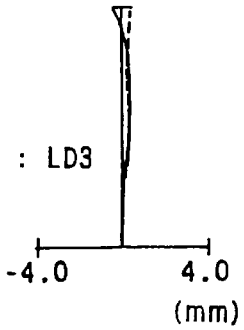
Figure 8F:
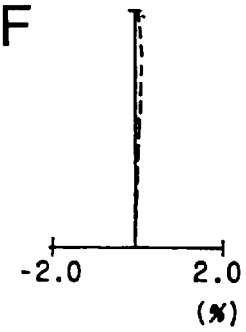
Figure 8G:
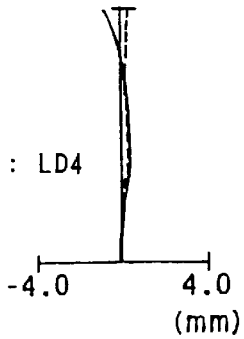
Figure 8H:
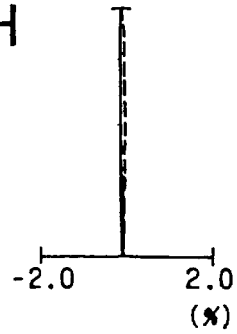

The lengthy toroidal lens 45 which is long in the direction corresponding to main scanning is provided on the light path from the constant-velocity optical-scanning image-forming mirror to the scanned surface, has an ordinary "normal toroidal surface", as shown in FIG. 7, as a convex surface of the lens surface thereof, and is provided so that this normal toroidal surface is directed to the side of the scanned surface.

The concave surface in the side of the constant-velocity optical-scanning image-forming mirror 41 of the lengthy toroidal lens 45 is "a barrel type of toroidal surface obtained by rotating a curve having a non-circular arch (in the figure, described as 'a non-circular curve'. It is generally described by the expression (2)) around the rotation axis in parallel to the direction corresponding to main scanning, in which a radius of the curvature in the direction corresponding to auxiliary scanning decreases with distance from the optical lens in the direction of main scanning".

It is assumed that each radius of the curvature, of the lengthy toroidal lens 41, on the optical axis in the direction corresponding to main scanning is described respectively as follows: $r_{M1}$ (a side of the constant-velocity optical-scanning image-forming mirror), $r_{M2}$, (a side of the scanned surface), $r_{S1}$, (a side of the constant-velocity optical-scanning image-forming mirror), and $r_{S2}$, (a side of the scanned surface) To discriminate the expression (2) indicating "a non-circular curve" shown in FIG. 7 from a case indicating a form of the reflecting surface in the constant-velocity optical-scanning image-forming mirror 41, x(H) is expressed as follows:

$$X(H)=CH^2/[1+\sqrt{[1-(1+K)C^2H^2]}]+\Sigma a_i\cdot H^i \quad \ldots (3)$$

and relating to the barrel type of toroidal surface, the form thereof is specified by giving the following values: $r_{M1}$ (=1/c); $r_{M2}$,k,$a_4$;$a_6$;$a_8$;$a_{10}$. It is assumed that a wall thickness of the lengthy toroidal lens 45 on the optical axis is $d_{TR}$ and a wavelength thereof is $n_{TR}$.

As shown in FIGS. 6A and 6B, a light path length from the constant-velocity optical-scanning image-forming mirror 41 to the lengthy toroidal lens 45 is set to "L" with a deflecting angle of zero (0), and a distance from the side face of the scanned surface of the lengthy toroidal lens 45 to the scanned surface 500 is set to "$D_5$".

Those values are as described below:

$r_{M1}=692.522$ mm,$K=-1.7171$, $a_4=-8.45792\times10^{-10}$,$a_6=1.09879\times10^{-14}$, $a_8$_1.47422×10−18,$a_{10}=2.92312\times10^{-23}$ $r_{S1}=69.2$,$d_{TR}=3.254$,$n_{TR}=1.5721$ $r_{M2}=667.087$ mm,$r_{S2}$_30.8 mm L=105.53 mm, $D_5=122.27$ mm The lengthy toroidal lens 45 is shifted, as shown in FIGS. 6A and 6B, by a shift rate $Z_{45}$ of 7.6 mm upward from a plane surface formed according to deflection of light fluxes with the optical axis thereof deflected by the optical deflector, and the optical axis thereof is tilted by a tilt angle: $\beta_{45}=1.28$ degrees toward the plane surface.

FIGS. 8A to 8D show curves of image surfaces (the broken line indicates a direction of main scanning, the solid line indicated a direction of auxiliary scanning) in an angle of view of ±40 degrees and constant-velocity performance (computed by the expression of fθ characteristics) in the multi-beam optical scanner having the configuration described above. FIG. 8A to FIG. 8D correspond to light fluxes radiated from the light emitting sections LD1 to LD4, respectively. The curves of image surfaces and constant-velocity performance are found extremely sufficient to any of the four light fluxes.

Figure 9:
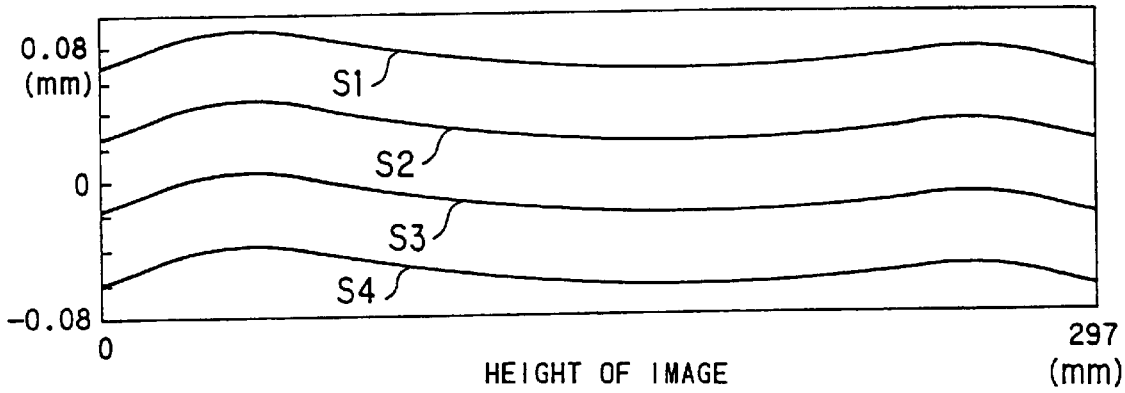
FIG. 9 is a view showing curvature states of four scanning lines concurrently scanned in the above example for Embodiment 1 shown in FIGS. 5A and 5B.

FIG. 9 shows states of curves in four scanning lines S1 to S4 concurrently scanned (correspond to the light fluxes from the light emitting sections LD1 to LD4, respectively). A curving rate of each scanning line is quite small such as 25 to 28 $\mu$m as compared to a scanning width in the direction of main scanning of 297 mm. Also, any of the four scanning lines concurrently scanned are directed to the same direction in the curve thereof, and for this reason, each pitch between scanning lines is uniform, and "pitch deviation" thereof is quite small such as 1.3 to 1.7 $\mu$m. That is because "a constant-velocity optical-scanning image-forming mirror is used".

The lateral magnification $\beta$ in the composite system of the optical system from the light source 10 for a multi-beam to the scanned surface 500 in the direction corresponding to auxiliary scanning is 3.02 times, which satisfies the condition (1).

A lateral magnification $\beta_1$ in the optical system (comprising the first image-formation system and the coupling lens) from the light source 10 for a multi-beam to the deflecting reflection surface in the direction corresponding to auxiliary scanning is 4.137 times, and a lateral magnification $\beta_2$ in the second image-formation system-between the deflecting reflection surface and the scanned surface in the direction corresponding to auxiliary scanning is 0.73 times. The lateral magnification $\beta_1$ is a value close to a value of a ratio: $f_{CY}/f_{CP}$=3.991 between a focal length of the coupling lens: $f_{CP}$=14.46 mm and a focal length of the cylinder lens 25 as the first image-formation system in the direction of auxiliary scanning: $f_{CY}$=57.71 mm.

It is considered that each pitch $P_o$ between the light emitting sections LD1 to LD4 is around 10 $\mu$m allowable as a minimum pitch to avoid the "thermal crosstalk" or the like, and if it is considered that the maximum value of an image density for optical scanning is 1200 dpi, the lateral magnification $\beta$ is [52.117] *2.117* to the pitch $P_o$ of 10 $\mu$m at that time, so that, in a case where the above element is used as the second image-formation system, in a focal length $f_{CP}$ of the coupling lens, a range from 5 to 25 mm is considered as a practical limitation thereof such that a lateral magnification $\beta_1$ in the side of light source from the deflecting reflection surface is 2.9 (2.117/0.73), and a range of a focal length $f_{CY}$ of the first image-formation system combined with the coupling lens as described above in the direction corresponding to auxiliary scanning is 14.5 to 72.5 mm. When the focal length $f_{CY}$ is smaller, a layout of the optical arrangement is difficult because the second image-formation system is close to the deflecting reflection surface. When the lower limit of a focal length $f_{CY}$ is 5 mm from conditions for the layout, the lateral magnification $\beta$ is preferably larger than 2 as shown in the condition (1).

When the minimum value of an image density for optical scanning is 300 dpi and assuming that the pitch between light emitting sections $P_o$ is set to 10 $\mu$m, the lateral magnification $\beta$is not more than 8.5 times in adjacent scanning as shown in the condition (1). In the magnification more than the above value, the pitch therebetween is smaller than 10 $\mu$m, which causes a problem of thermal crosstalk to occur.

As described above, with the present invention, it is possible to realize an entirely new multi-beam optical scanner. With the multi-beam optical scanner according to the present invention, it is possible to maintain fidelity in reproduction of a recorded image in a good condition by effectively reducing a deviation rate of a pitch between scanning liens for optical scanning. In addition, a lengthy lens of the second image-formation system can be provided spaced from a scanned surface, so that dirt due to toner splashed from the lengthy lens can effectively reduced.

Also, scanning lines concurrently scanned are adjacent to each other, so that there is no such a problem that "selection of a signal for modulating each beam is irregular, which causes optical scanning to be easily complicated" like in the interlace scanning.

Further, a position of the first image-formation system to be arranged is not too close to an optical deflector, so that a layout of the optical arrangement can easily be provided.

In the another aspect of the present invention, by using a constant-velocity optical-scanning image-forming mirror, the curves of a plurality of scanning lines concurrently scanned are directed to the same direction, so that, "a deviation rate of a pitch" is small even three or more scanning lines are scanned at the same time, and for this reason, optical scanning for a recorded image can be realized in high quality, non-uniformity in constant-velocity performance due to "wavelength deviation" does not occur even if a light source for a multi-beam with two or more LD light emitting sections or LED light emitting section provided in "hybrid" combination thereof.

This application is based on Japanese patent application Nos. HEI 8-142791 and HEI 9-002334 filed in the Japanese Patent Office on Jun. 5, 1996 and Jan. 9, 1997, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multi-beam optical scanner comprising:

a light source for [a multi-beam] *providing plural light beams*;

[a coupling lens for coupling a plurality of light fluxes from said light source for a multi-beam to an image-forming optical system;]

a first image-formation system for focusing [a plurality of light fluxes coupled by said coupling lens] *the plural light beams from the light source* in a direction corresponding to auxiliary scanning and forming [them to] *the plural light beams into* images as a plurality of line images each [long] *having a longer side* in a direction corresponding to main scanning;

an optical deflector having a deflecting reflection surface adjacent to positions where [images as] said plurality of line images are formed for deflecting [said plurality of light fluxes] *the plural light beams*;

a second image-formation system for separating the [plurality of light fluxes] *plural light beams* deflected by said optical deflector from each other in a direction of auxiliary scanning on a scanned surface and converging the [plurality of light fluxes] *plural light beams* as a plurality of light spots for optically scanning said scanned surface in accordance with deflection of the *plural* light [fluxes] *beams*; wherein

*the plurality of light spots on the scanned surface optically scan scanning lines adjacent to each other on plural consecutive scans, and* a lateral magnification $\beta$ in a direction corresponding to the auxiliary scanning [in a composite system] of the optical [system] *scanner* between said light source [for a multi-beam] and said scanned surface is as follows:

$$2<\beta<8.5$$

[and the plurality of light spots on the scanned surface optically scan scanning lines adjacent to each other].

2. A multi-beam optical scanner according to claim 1[;], wherein said light source [for a multi-beam] comprises *at least* two [or more] LD light emitting sections [or LED light emitting sections] monolithically provided therein.

3. A multi-beam optical scanner according to claim 1[;], wherein said light source [for a multi-beam] comprises [two or more] *at least a pair of* LD light emitting sections [or LED light emitting sections] in [hybrid] combination [thereof].

4. A multi-beam optical scanner according to claim 1[;], wherein said light source [for a multi-beam has] *comprises* two LD light emitting sections, [and] *wherein* said LD light emitting sections are provided symmetric with respect to an optical axis of a coupling lens.

5. A multi-beam optical scanner according to claim 1[; wherein said], *further comprising a* coupling lens [is a collimate lens] for [collimating a plurality of] *coupling at least one* light [fluxes] *beam of the plural light beams* from said light source [for a multi-beam at the same time].

6. A multi-beam optical scanner according to claim 1[;], wherein said second image-formation system includes a lengthy lens provided in a side of the scanned surface.

7. A multi-beam optical scanner according to claim 1[;], wherein said first image-formation system comprises a [piece of] lens having power only in the auxiliary scanning direction, while said second image-formation system comprises a constant-velocity optical-scanning image-forming mirror and a lengthy lens each provided on the side of the scanned surface.

[8. A multi-beam optical scanner according to claim 1; wherein a lateral magnification β in a direction corresponding to the auxiliary scanning in a composite system of the optical system between said light source for a multi-beam and the scanned surface is as follows:

$2<\beta\leqq 8.5$.]

*9. A multi-beam optical scanner according to claim 5, wherein said coupling lens is a collimate lens for collimating the plural light beams from said light source at the same time.*

*10. A multi-beam optical scanner according to claim 1, wherein said light source comprises at least two LED light emitting sections monolithically provided therein.*

*11. A multi-beam optical scanner according to claim 1, wherein said light source comprises at least a pair of LED light emitting sections in combination.*

*12. A multi-beam optical scanner comprising:*

*plural light beams;*

*a first image-formation system for focusing the plural light beams in a direction corresponding to auxiliary scanning and forming the plural light beams into images as a plurality of line images each having a longer side in a direction corresponding to main scanning;*

*an optical deflector having a deflecting reflection surface adjacent to positions where said plurality of line images are formed for deflecting the plural light beams;*

*a second image-formation system for separating the plural light beams deflected by said optical deflector from each other in a direction of auxiliary scanning on a scanned surface and converging the plural light beams as a plurality of light spots for optically scanning said scanned surface in accordance with deflection of the plural light beams; wherein*

*the plurality of light spots on the scanned surface optically scan scanning lines adjacent to each other on plural consecutive scans, and*

*a lateral magnification β in a direction corresponding to the auxiliary scanning of the optical scanner is as follows:*

$2<\beta<8.5$.

*13. An image forming apparatus comprising:*

*a multi-beam optical scanner including:*

*a light source for providing plural light beams;*

*a first image-formation system for focusing the plural light beams from the light source in a direction corresponding to auxiliary scanning and forming the plural light beams into images as a plurality of line images each having a longer side in a direction corresponding to main scanning;*

*an optical deflector having a deflecting reflection surface adjacent to positions where said plurality of line images are formed for deflecting the plural light beams;*

*a second image-formation system for separating the plural light beams deflected by said optical deflector from each other in a direction of auxiliary scanning on a scanned surface and converging the plural light beams as a plurality of light spots for optically scanning said scanned surface in accordance with deflection of the plural light beams; wherein*

*the plurality of light spots on the scanned surface optically scan scanning lines adjacent to each other on plural consecutive scans, and*

*a lateral magnification β in a direction corresponding to the auxiliary scanning of the optical scanner is as follows:*

$2<\beta<8.5$.

*14. An image forming apparatus comprising:*

*a multi-beam optical scanner including:*

*plural light beams;*

*a first image-formation system for focusing the plural light beams in a direction corresponding to auxiliary scanning and forming the plural light beams into images as a plurality of line images each having a longer side in a direction corresponding to main scanning;*

*an optical deflector having a deflecting reflection surface adjacent to positions where said plurality of line images are formed for deflecting the plural light beams;*

*a second image-formation system for separating the plural light beams deflected by said optical deflector from each other in a direction of auxiliary scanning on a scanned surface and converging the plural light beams as a plurality of light spots for optically scanning said scanned surface in accordance with deflection of the plural light beams; wherein*

*the plurality of light spots on the scanned surface optically scan scanning lines adjacent to each other on plural consecutive scans, and*

*a lateral magnification β in a direction corresponding to the auxiliary scanning of the optical scanner is as follows:*

$2<\beta<8.5$.

* * * * *